(12) United States Patent
Banerjee et al.

(10) Patent No.: US 7,389,422 B2
(45) Date of Patent: Jun. 17, 2008

(54) SYSTEM FOR FORWARDING AND VERIFYING MULTIPLE DIGITAL SIGNATURES CORRESPONDING TO USERS AND CONTRIBUTIONS OF THE USERS IN ELECTRONIC MAIL

(75) Inventors: Dwip N. Banerjee, Austin, TX (US); Rabindranath Dutta, Austin, TX (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 11/403,584

(22) Filed: Apr. 13, 2006

(65) Prior Publication Data

US 2006/0190545 A1 Aug. 24, 2006

Related U.S. Application Data

(62) Division of application No. 09/951,820, filed on Sep. 13, 2001, now abandoned.

(51) Int. Cl.
*H04L 9/00* (2006.01)
(52) U.S. Cl. .................... 713/176; 713/180
(58) Field of Classification Search ............ 709/205, 709/206, 207, 225; 713/187, 150, 167, 176, 713/180; 705/35, 37, 53, 50; 359/341.3
See application file for complete search history.

(56) References Cited

U.S. PATENT DOCUMENTS

| | | | |
|---|---|---|---|
| 4,868,877 A | 9/1989 | Fischer | |
| 5,005,200 A | 4/1991 | Fischer | |
| 5,214,702 A | 5/1993 | Fischer | |
| 5,412,717 A | 5/1995 | Fischer | |
| 5,465,299 A | 11/1995 | Matsumoto et al. | |
| 5,661,805 A | 8/1997 | Miyauchi | |
| 5,915,024 A | 6/1999 | Kitaori et al. | |
| 5,917,912 A | 6/1999 | Ginter et al. | |
| 5,966,445 A | 10/1999 | Park et al. | |
| 5,996,113 A | 11/1999 | Korn et al. | |

(Continued)

FOREIGN PATENT DOCUMENTS

JP 6315036 A 11/1994

OTHER PUBLICATIONS

Tanaka, K. et al., "Digital Multi-Signature Scheme for Facsimile-Mail Service", Denshi Joho Tsushin Gakkai Ronbunshi B-1, vol. J74, No. 10, Oct. 1991, pp. 748-756.

*Primary Examiner*—Le Luu
(74) *Attorney, Agent, or Firm*—Duke W. Yee; Matthew W. Baca; Brandon G. Williams

(57) ABSTRACT

A mechanism is provided for augmenting the mail header of a message with a list of digital signatures representing the chain of contributors to the message. The augmented header may also encode the actual contributions corresponding to each digital signature. The list is appended every time a message is forwarded. If a message has a portion with no corresponding digital signature or if one or more of the digital signatures is not trusted, the user may handle the message accordingly. Furthermore, a mail server or client may discard a message if the number of digital signatures exceeds a threshold to filter out unwanted messages, such as e-mail chain letters.

6 Claims, 6 Drawing Sheets

U.S. PATENT DOCUMENTS

| | | |
|---|---|---|
| 6,038,665 A | 3/2000 | Bolt et al. |
| 6,070,239 A * | 5/2000 | McManis .................... 713/187 |
| 6,212,637 B1 | 4/2001 | Ohta et al. |
| 6,219,787 B1 * | 4/2001 | Brewer ....................... 713/167 |
| 6,351,816 B1 * | 2/2002 | Mueller et al. ............. 713/176 |
| 6,370,249 B1 | 4/2002 | Van Oorschot |
| 6,681,114 B2 | 1/2004 | Chang et al. |
| 6,816,900 B1 * | 11/2004 | Vogel et al. ................ 709/225 |
| 6,915,433 B1 * | 7/2005 | Barber ....................... 713/176 |
| 7,143,290 B1 * | 11/2006 | Ginter et al. ............... 713/176 |
| 2001/0018675 A1 | 8/2001 | Blaze et al. |
| 2001/0042104 A1 | 11/2001 | Donoho et al. |
| 2001/0043388 A1 | 11/2001 | Danziger et al. |
| 2002/0007453 A1 | 1/2002 | Nemovicher |
| 2002/0059364 A1 | 5/2002 | Coulthard et al. |
| 2002/0124167 A1 | 9/2002 | Toyota et al. |
| 2002/0144140 A1 | 10/2002 | Ellison et al. |
| 2002/0156849 A1 | 10/2002 | Donoho et al. |
| 2002/0178356 A1 | 11/2002 | Mattila |
| 2003/0135464 A1 | 7/2003 | Mourad et al. |
| 2004/0054630 A1 | 3/2004 | Ginter et al. |
| 2004/0073507 A1 | 4/2004 | Scott et al. |

\* cited by examiner

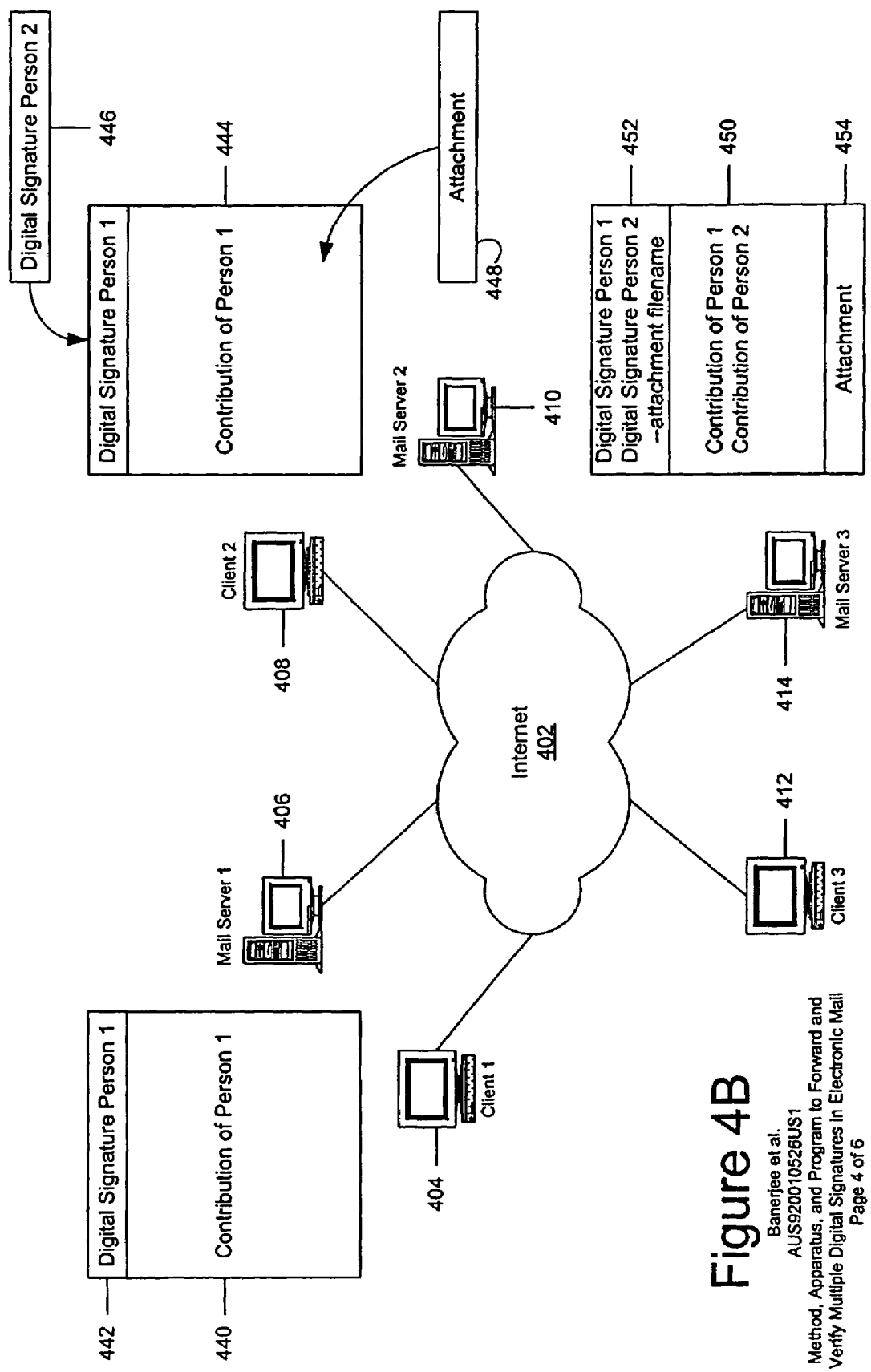

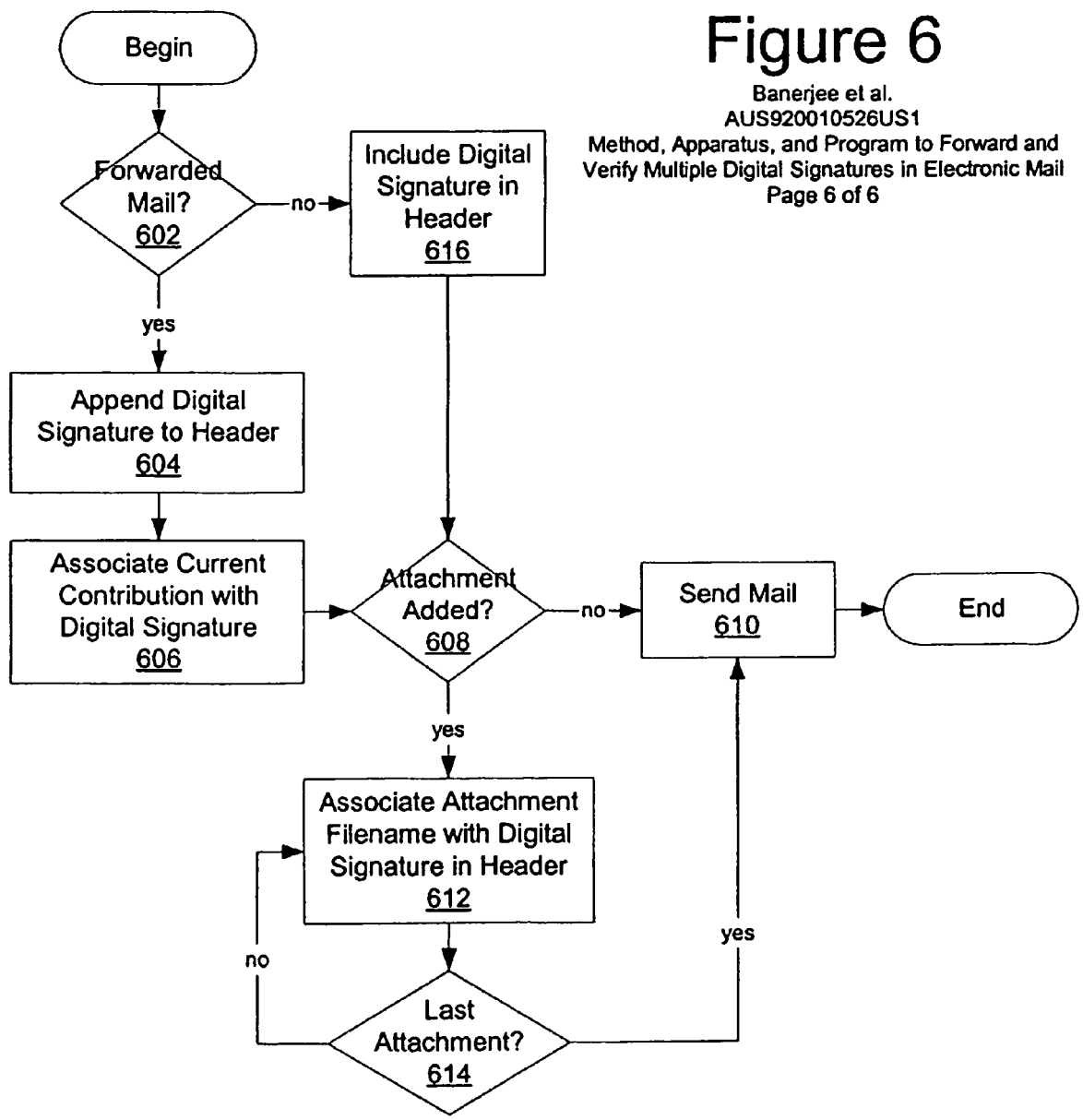

SYSTEM FOR FORWARDING AND VERIFYING MULTIPLE DIGITAL SIGNATURES CORRESPONDING TO USERS AND CONTRIBUTIONS OF THE USERS IN ELECTRONIC MAIL

This application is a divisional of application Ser. No. 09/951,820, filed Sep. 13, 2001, now abandoned.

BACKGROUND OF THE INVENTION

1. Technical Field

The present invention relates to network data processing systems and, in particular, to electronic mail. Still more particularly, the present invention provides a method, apparatus, and program for verifying multiple digital signatures in mail forwarding.

2. Description of Related Art

With the increasing popularity of computers, paper transactions are gradually being replaced by digital formats, such as e-mail and electronic data interchange (EDI). While the legal framework to establish and support the validity of digital transactions are evolving, it is clear that digital signatures will play a pivotal role, especially in the area of non-repudiation in the near future. Therefore, it is essential that important documents are digitally signed for them to support the framework alluded to above.

In this context, e-mail plays a pivotal role in communications, both in the corporate and noncorporate worlds. Since the content of e-mail can evoke a range of actions, such as litigation, it is important to assign responsibility and the non-repudiation properties to e-mail transmissions. Furthermore, with the spread of viruses and spyware through electronic transmissions, improved security and accountability is needed. Under current implementations, an e-mail message typically bears the digital signature of the sender. However, in the case of forwarded e-mail, there is no way to attach easily enforceable non-repudiation properties and responsibilities to the chain of recipients. In essence, the sender becomes responsible for the entire content in case of disputes under the current implementations. This implies that the sender has to always peruse through the entire chain before forwarding an e-mail message. This may be time consuming.

Therefore, it would be advantageous to provide a mechanism for the insertion and retention of multiple digital signatures corresponding to contributing authors in forwarded e-mail.

SUMMARY OF THE INVENTION

The present invention provides a mechanism for augmenting the mail header of a message with a list of digital signatures representing the chain of contributors to the message. The augmented header may also encode the actual contributions corresponding to each digital signature. For example, when a user forwards a message and makes a contribution, the beginning bytes and length of the contribution may be associated with that user's digital signature in the header. Similarly, an attachment filename may be associated with a user that attaches a file in a forwarded message. The list is appended every time a message is forwarded. If a message has a portion with no corresponding digital signature or if one or more of the digital signatures is not trusted, the user may handle the message accordingly. For example, a user may choose to delete a message without opening if a file is attached by an untrusted user. Furthermore, a mail server or client may discard a message if the number of digital signatures exceeds a threshold to filter out unwanted messages, such as e-mail chain letters.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A and 4B are pictorial representations of example network data processing systems in accordance with a preferred embodiment of the present invention;

FIG. 6 is a flowchart illustrating the operation of a mail client sending a message in accordance with a preferred embodiment of the present invention;

DETAILED DESCRIPTION OF THE PREFERRED EMBODIMENT

Figure 1:
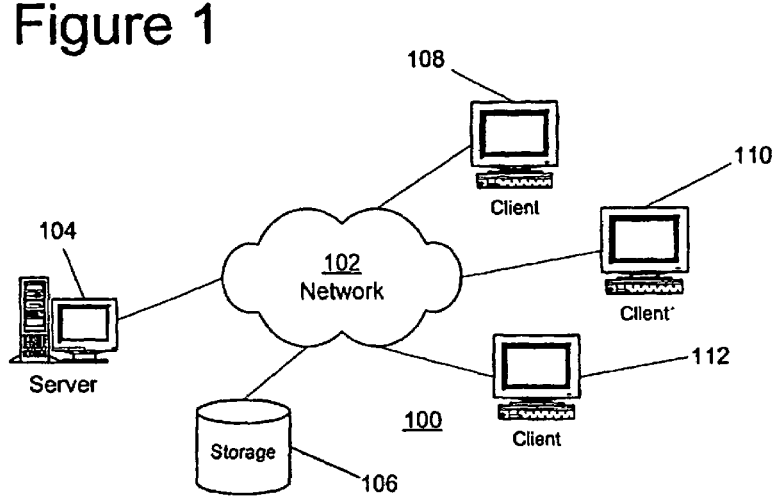
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network 102 represents the Internet, a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
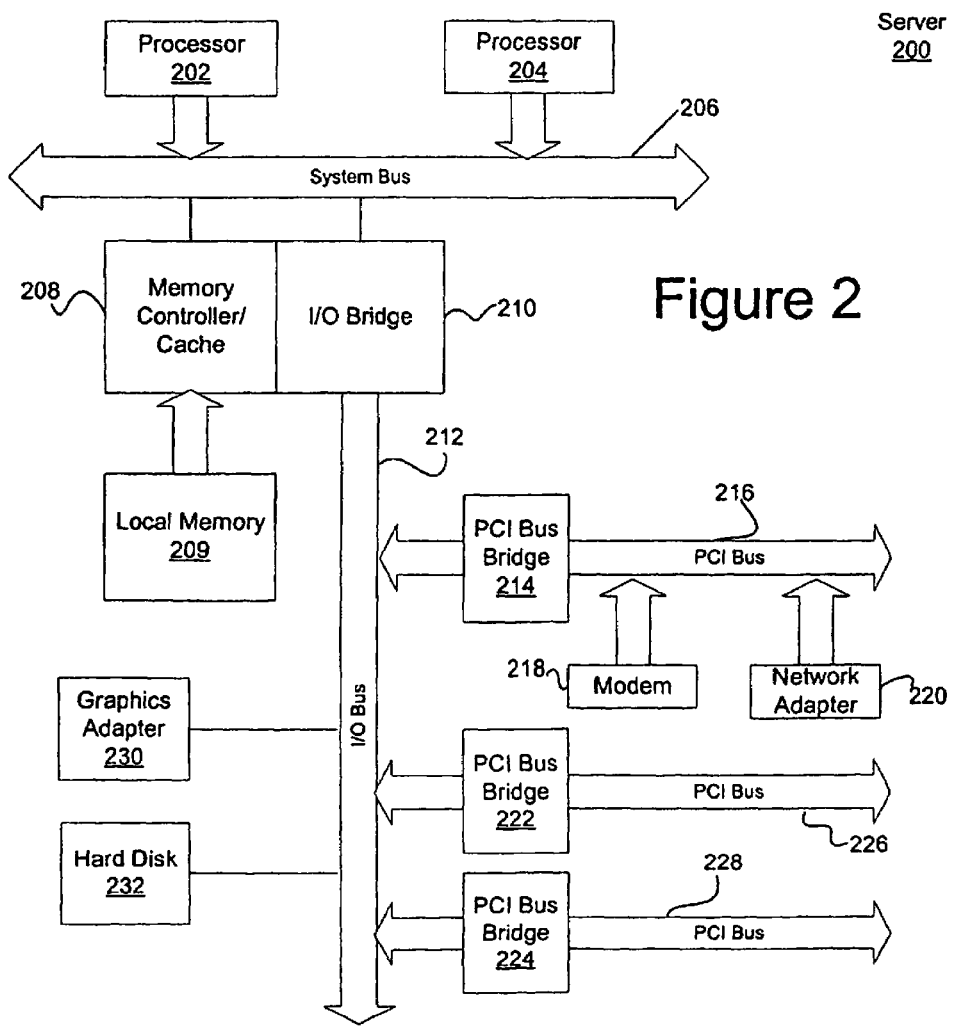
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
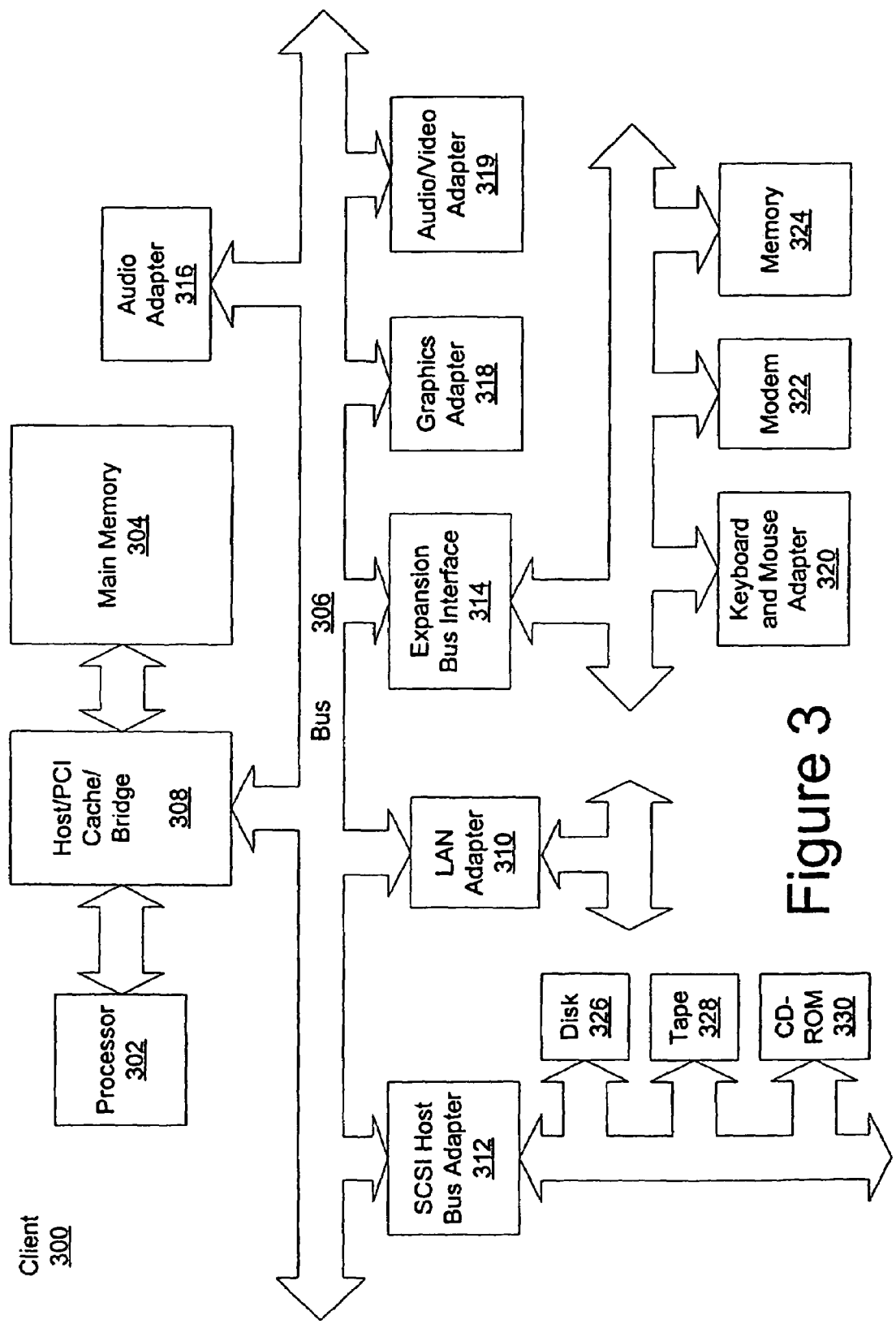
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Returning to FIG. 1, server 104 may be a message server, such as an e-mail server. Clients 108, 110, 112 may transmit messages to one another through server 104. More particularly, the messages may be forwarded e-mail messages. For example, client 108 may send an e-mail message to client 110 and client 110 may forward the e-mail message to client 112. While FIG. 1 shows one server, the network configuration may include more servers. In fact, each client may have its own mail server.

In prior art implementations, e-mail messages typically bear the digital signature of the sender. In other words, when a message is sent from client 108 to client 110, the message bears the digital signature of the user of client 108. When the message is forwarded from client 110 to client 112, the forwarded message bears the digital signature of the user of client 110. Therefore, the user of client 112 can only authenticate the message with respect to the user of client 110. Even if the user of client 112 trusts the user of client 110, there is no way in the prior art to authenticate the originator of the forwarded message.

In accordance with a preferred embodiment of the present invention, each client executes e-mail client software that augments the e-mail message header with a list of digital signatures representing the chain of contributors in an e-mail. The list is appended every time an e-mail message is forwarded. The header may also encode the actual contributions corresponding to each digital signature. For example, when a user forwards a message and includes a contribution, the beginning bytes and length of the contribution are associated with that user's digital signature in the header. However, other methods of associating the contribution with the digital signature may be used, such as marking up the actual message content. Furthermore, an attachment filename may also be associated with a user that attaches a file in a forwarded message.

Figure 4A:
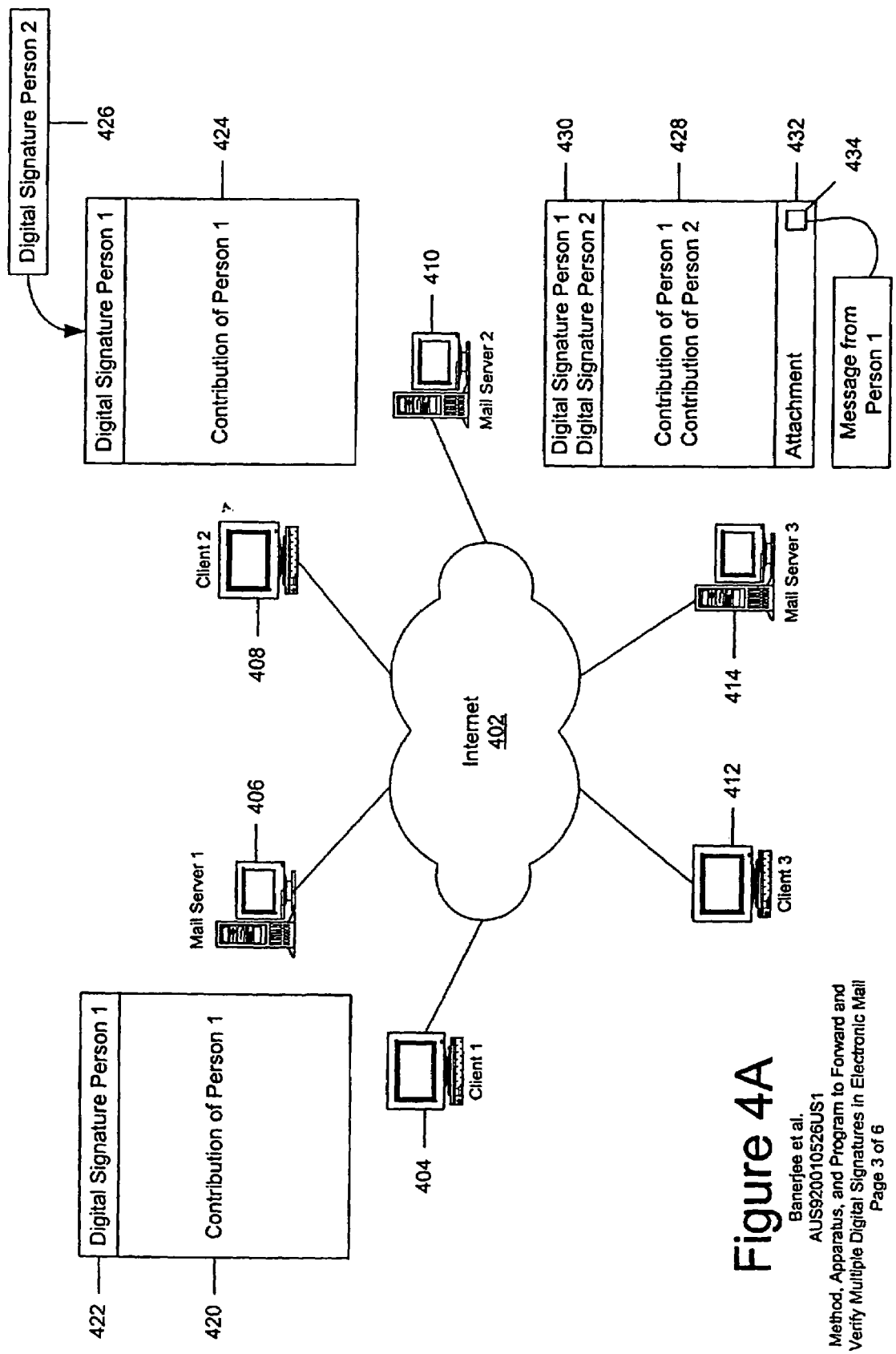

With reference to FIGS. 4A and 4B, pictorial representations of example network data processing systems are shown in accordance with a preferred embodiment of the present invention. Particularly, with respect to FIG. 4A, a network data processing system contains Internet 402, which is the medium used to provide communications links between various devices and computers connected together within the network data processing system. Client 1 404 communicates with mail server 1 406 through Internet 402 to send and receive mail. Similarly, client 2 408 communicates with mail server 410 and client 3 412 communicates with mail server 3 414.

Person 1 uses client 1 to composes message 420 and sends the message to person 2 at client 2. Mail message 420 bears digital signature 422 for person 1 and includes the contribution of person 1. The mail message is transferred by sending the message from client 1 to mail server 1. Mail server 1 then transfers the message to mail server 2. Person 2 may then retrieve the mail message as message 424 from mail server 2 using client 2. Person 2 may then authenticate the digital signature of person 1 in a known manner.

Person 2 may then make a contribution and forward the message. When person 2 forwards message 424 to person 3, the mail client software running on client 2 appends digital signature 426 of person 2 to message 424 and includes a contribution of person 2 before transferring the message to mail server 2. Mail server 2 then transfers the message to mail server 3, where it may be delivered to client 3.

When person 3 retrieves the message as message 428 from mail server 3, the message includes in the header digital signatures 430. These digital signatures include the digital signature for person 1 and the digital signature for person 2. The message body includes the contribution of person 1 and the contribution of person 2. The header may also encode the actual contributions corresponding to each digital signature, as stated above.

In an alternative embodiment, when person 2 forwards message 424, the message from person 1 is included as attachment. Thus, when person 3 retrieves message 428, the message includes attachment 432 including message 434 from person 1. The header may then associate the digital signature of person 1 with the attachment. Therefore, the digital signature for person 2 may be verified with respect to message 428 and the digital signature for person 1 may be verified with respect to message 434.

Turning now to FIG. 4B, an example is shown in which an attachment is added in a forwarded message. Person 1 uses client 1 to send message 440 to person 2 at client 2. Mail message 440 bears digital signature 442 for person 1 and includes a contribution of person 1. Person 2 receives the message as message 444 and may then authenticate the digital signature of person 1. When person 2 forwards message 444 to person 3, the mail client software running on client 2 appends digital signature 446 of person 2 to message 444 before transferring the message to mail server 2. Person 2 may include attachment 448 in message 444. The mail client software running on client 2 then includes the contribution of person 2, including the file attachment, and associates the attachment filename with the digital signature for person 2. Mail server 2 then transfers the message to mail server 3, where it may be delivered to client 3.

When person 3 retrieves the message as message 450 from mail server 3, the message includes in the header digital signatures 452. These digital signatures include the digital signature for person 1 and the digital signature for person 2. The header may also encode the actual contributions corresponding to each digital signature. Particularly, the header associates the attachment filename with the digital signature for person 2. Thus, person 3 may authenticate the digital signature for person 2 before opening the attachment. Furthermore, even if person 3 forwards the message to another person, the attachment remains associated with the digital signature for person 2.

The contributions may also be encoded within the header, such as by indicating a beginning location and a length of a contribution. Alternatively, contributions may be encoded within the body of the message, such as through journaling techniques or tools for tracking edits similar to those in word processing applications. For example, a mail client application may track changes made by each user and display the changes for each person using a different color.

Figure 5:
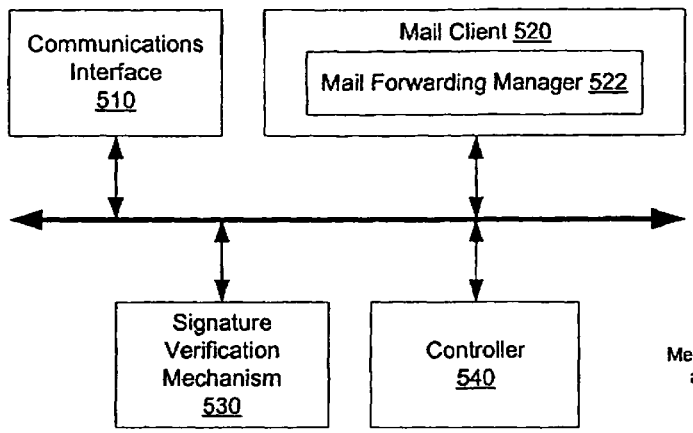
FIG. 5 is a flowchart illustrating the operation of a mail client sending a message in accordance with a preferred embodiment of the present invention.

With reference to FIG. 5, a block diagram of the functional components of a client device is shown in accordance with a preferred embodiment of the present invention. The client device includes communications interface 510 that is used to communicate with a mail server to send and receive mail messages. The system also includes mail client 520 for presenting, organizing, and composing mail messages. Mail client 520 includes mail forwarding manager 522. The mail forwarding manager allows the user to forward mail messages and to verify forwarded mail messages that are received. Digital signatures are verified using signature verification mechanism 530.

Controller 540 controls the overall operation of the client device. Controller 540 sends and receives data through communications interface 510 and controls the operation of mail client and the signature verification mechanism to carry out the functions of the present invention. The elements of the functional block diagram of FIG. 5 may be implemented as hardware, software, or a combination of hardware and software components. In a preferred embodiment, the functional elements shown in FIG. 5 are implemented as software instructions executed by one or more of the hardware elements shown in FIG. 3.

With reference to FIG. 6, a flowchart is depicted illustrating the operation of a mail client sending a message in accordance with a preferred embodiment of the present invention. The process begins when a mail message is being sent. A determination is made as to whether the mail is forwarded mail (step 602). If the mail is forwarded mail, the process appends the digital signature of the sender to the message header (step 604) and associates the current contribution with the digital signature of the sender (step 606).

Next, a determination is made as to whether an attachment is added (step 608). If an attachment is not added, the process sends the mail message (step 610) and ends. If an attachment is added in step 608, the process associates the attachment filename with the digital signature of the sender in the header (step 612). Then, a determination is made as to whether the attachment is the last attachment (step 614). If the attachment is the last attachment, the process sends the mail message (step 610) and ends. If the attachment is not the last attachment, the process returns to step 612 to associate the next attachment filename with the digital signature of the sender in the header.

Returning to step 602, if the mail message is not forwarded mail, the process includes the digital signature of the sender in the header (step 616) as known in the art. Thereafter, the process proceeds to step 608 to determine whether an attachment is added. Thus, the present invention may associate an attachment filename with the sender even if the message is not a forwarded mail message. This allows any file attachments to be associated with the sender if the message is forwarded by any of the recipients.

Figure 7:
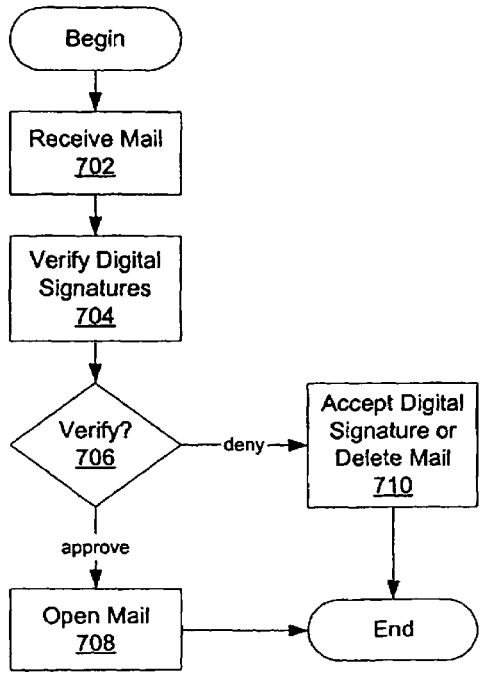
FIG. 7 is a flowchart depicting the operation of a mail client receiving a message in accordance with a preferred embodiment of the present invention.

With reference now to FIG. 7, a flowchart depicting the operation of a mail client receiving a message is shown in accordance with a preferred embodiment of the present invention. The process begins and receives a mail message (step 702). The process then verifies the digital signatures in the header (step 704). A determination is made as to whether the signatures are verified (step 706). If the digital signatures are approved, the mail client opens the mail message (step 708) and ends. However, if the digital signatures are not verified in step 706, the process gives the user the option to accept the digital signature or delete the mail message (step 710) and ends.

Thus, if the user knows and trusts the person associated with the digital signature, the user may accept the digital signature to be added to the trusted list. However, if the user does not recognize or trust the person, the user may simply delete the e-mail without being exposed to its content.

The signatures may be verified by checking the authenticity of the signatures themselves. Furthermore, a user may not trust a sender and the mail message may not be verified, because one of the senders in the chain is not trusted. Still further, the forwarded mail message may include content for which there is no associated digital signature. For example, a mail message may include an attachment, the filename of which is not associated with a digital signature. Such a mail message would fail verification.

Figure 8:
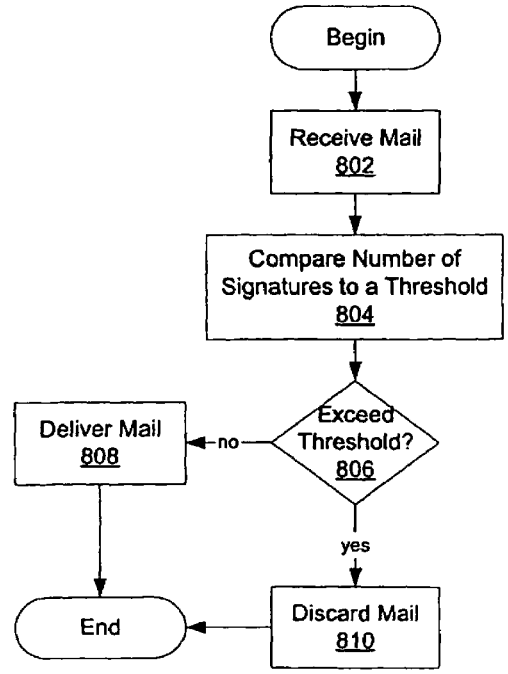
FIG. 8 is a flowchart illustrating the operation of a process for filtering out unwanted messages in accordance with a preferred embodiment of the present invention.

Turning now to FIG. 8, a flowchart illustrating the operation of a process for filtering out unwanted messages is shown in accordance with a preferred embodiment of the present invention. The process begins and receives a mail message (step 802). Next, the process compares the number of digital signatures in the header to a threshold (step 804) and a determination is made as to whether the number of signatures exceeds the threshold (step 806). If the number of signatures does not exceed the threshold, the process delivers the mail to the user's mailbox (step 808) and ends. If the number of signatures exceeds the threshold in step 806, the process discards the mail message (step 810) and ends.

The threshold may be selected by a user. For example, a subscriber to the mail server may determine that a mail message that has been forwarded fifty or more times, for instance, is likely to be an e-mail chain letter.

Thus, the present invention solves the disadvantages of the prior art by providing a mechanism for augmenting the mail header of a message with a list of digital signatures representing the chain of contributors to the message. The augmented header may also encode the actual contributions corresponding to each digital signature. The list is appended every time a message is forwarded. If a message has a portion with no corresponding digital signature or if one or more of the digital signatures is not trusted, the user may handle the message accordingly. Furthermore, a mail server or client may discard a message if the number of digital signatures exceeds a threshold to filter out unwanted messages, such as e-mail chain letters.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for receiving a forwarded message, comprising:

receiving a message at a computer of a third user, wherein the message was sent from a first user to a second user and subsequently forwarded to the third user, and wherein the message has attached thereto a first digital signature and a second digital signature, the first digital signature corresponding to the first user and to a first contribution made by the first user, and the second digital signature corresponding to the second user and to a second contribution made by the second user;

verifying the first digital signature and the second digital signature; and opening the message if the first digital signature and the second digital signature are approved.

2. The method of claim 1, wherein the step of verifying the first digital signature and the second digital signature comprises:

comparing the first digital signature and the second digital signature to a list of trusted digital signatures; and approving the first digital signature and the second digital signature if they are in the list of trusted digital signatures.

3. The method of claim 2, further comprising:

denying at least one of the first digital signature if the first digital signature is not in the list of trusted digital signatures or the second digital signature if the second digital signature is not in the list of trusted digital signatures, wherein, by denying, a denied digital signature is formed;

prompting the third user to accept the denied digital signature; and adding the denied digital signature to the list of trusted digital signatures if the user accepts the denied digital signature.

4. The method of claim 2, further comprising deleting the message if the first digital signature or the second digital signature is not approved.

5. The method of claim 1, further comprising:
- attaching to the message a third digital signature corresponding to the third user; and
- forwarding the message to a fourth user.

6. The method of claim 1, further comprising:
- receiving a message, wherein the message was forwarded by a plurality of users, and wherein the message has attached thereto digital signatures corresponding to each of the plurality of users;
- determining the number of users in the plurality of users;
- comparing the number to a threshold; and
- discarding the message if the number exceeds the threshold.

\* \* \* \* \*